(12) United States Patent
Chen et al.

(10) Patent No.: US 7,954,203 B2
(45) Date of Patent: Jun. 7, 2011

(54) HINGE AND AN ELECTRONIC DEVICE WITH THE HINGE

(75) Inventors: Wei-Chun Chen, Shulin (TW); Chia-Hsiang Chen, Shulin (TW); Weiming Chen, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 377 days.

(21) Appl. No.: 12/339,769

(22) Filed: Dec. 19, 2008

(65) Prior Publication Data

US 2010/0154170 A1 Jun. 24, 2010

(51) Int. Cl.
*E05D 3/10* (2006.01)

(52) U.S. Cl. ............... 16/367; 16/239; 16/340; 16/374; 16/384

(58) Field of Classification Search .............. 16/296, 16/229, 233, 286, 310, 364, 362, 242, 243, 16/246, 291, 282, 287, 288, 294, 302, 366–370, 16/266, 380, 357, 359, 303, 250, 304; 455/575.3; 379/433.13; 361/679.06, 679.07, 679.09, 361/679.27
See application file for complete search history.

(56) References Cited

U.S. PATENT DOCUMENTS

| | | | | |
|---|---|---|---|---|
| 5,077,864 A * | 1/1992 | Kawasaki | .................. | 16/278 |
| 6,629,336 B2 * | 10/2003 | Hosaka et al. | ................ | 16/327 |
| 6,804,861 B2 * | 10/2004 | Hsu | ................ | 16/366 |
| 6,920,668 B2 * | 7/2005 | Hayashi | .................. | 16/303 |
| 7,028,373 B2 * | 4/2006 | Harmon et al. | ................ | 16/284 |
| 7,047,598 B2 * | 5/2006 | Huang | .................. | 16/312 |
| 7,055,219 B2 * | 6/2006 | Shiba | .................. | 16/367 |
| 7,150,075 B2 * | 12/2006 | Kato | .................. | 16/367 |
| 7,380,314 B2 * | 6/2008 | Hung | .................. | 16/367 |
| 7,469,449 B2 * | 12/2008 | Hsu | .................. | 16/367 |
| 7,621,020 B2 * | 11/2009 | Hsu et al. | .................. | 16/340 |
| 7,706,137 B2 * | 4/2010 | Iijima et al. | .............. | 361/679.07 |
| 7,752,711 B1 * | 7/2010 | Chen et al. | .................. | 16/347 |
| 2003/0056327 A1 * | 3/2003 | Lin et al. | ................ | 16/342 |
| 2005/0102799 A1 * | 5/2005 | Huang | .................. | 16/367 |
| 2005/0150080 A1 * | 7/2005 | Lu et al. | ................ | 16/367 |
| 2005/0150081 A1 * | 7/2005 | Gan | ................ | 16/367 |
| 2006/0117528 A1 * | 6/2006 | Duan et al. | ................ | 16/303 |
| 2007/0151076 A1 * | 7/2007 | Sato et al. | ................ | 16/287 |
| 2008/0034546 A1 * | 2/2008 | Hsu | ................ | 16/367 |
| 2008/0034550 A1 * | 2/2008 | Chang et al. | .................. | 16/367 |
| 2008/0078061 A1 * | 4/2008 | Hsu et al. | ................ | 16/367 |
| 2008/0196204 A1 * | 8/2008 | Lin et al. | ................ | 16/341 |
| 2008/0263827 A1 * | 10/2008 | Hsu et al. | ................ | 16/362 |
| 2008/0282503 A1 * | 11/2008 | Chen | ................ | 16/342 |

\* cited by examiner

*Primary Examiner* — Thomas B Will
*Assistant Examiner* — Emily Morgan
(74) *Attorney, Agent, or Firm* — patenttm.us (57) ABSTRACT

A hinge is mounted between a cover and a base of an electronic device. A lid covers the hinge and is attached securely to the base. The hinge has a cam wing, a sleeve, a rotating shaft and a pin. The rotating shaft is mounted slidably in the sleeve. The pin is mounted slidably and transversely through the sleeve, is attached securely to the rotating shaft and slides along the outer edge of the cam wing. When the cover is pivoted to a certain angle, the pin slide at part of the cam wing having larger diameter to gradually lift up the cover so the cover is selectively distant away from the lid. Therefore, the shape of the electronic device does not need to be disfigured and the cover still does not bump against the lid.

20 Claims, 7 Drawing Sheets

FIG. 8
PRIOR ART

HINGE AND AN ELECTRONIC DEVICE WITH THE HINGE

BACKGROUND OF THE INVENTION

The present invention relates to a hinge and an electronic device with the hinge, especially to the hinge that is mounted between the cover and the base of the electronic device and has a shaft which slides while the cover is pivoted.

DESCRIPTION OF THE PRIOR ARTS

Figure 7:
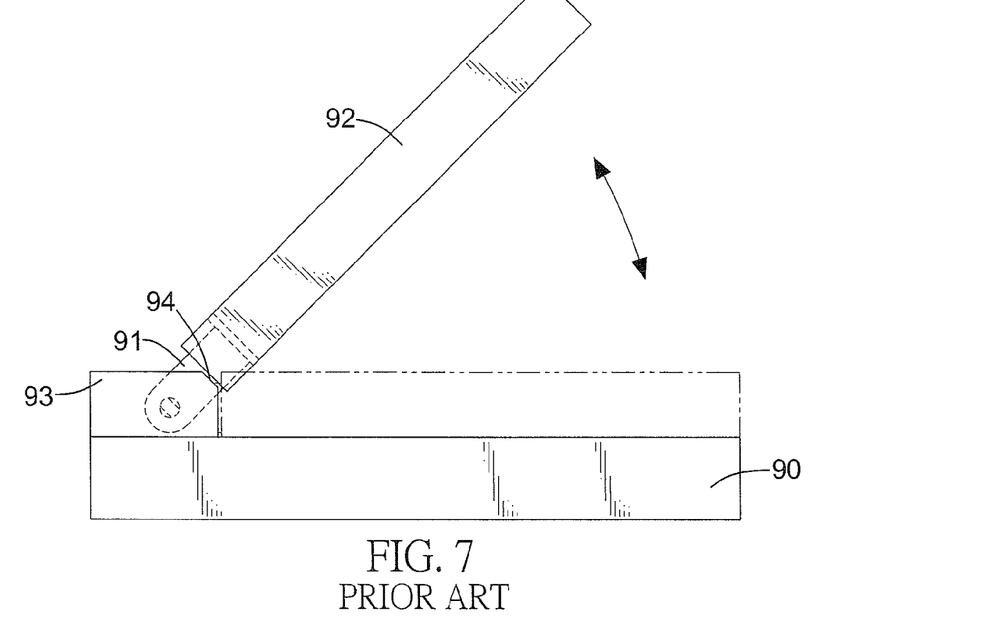
FIG. 7 is an operational side view of a conventional electronic device in accordance with the prior art.
Figure 8:
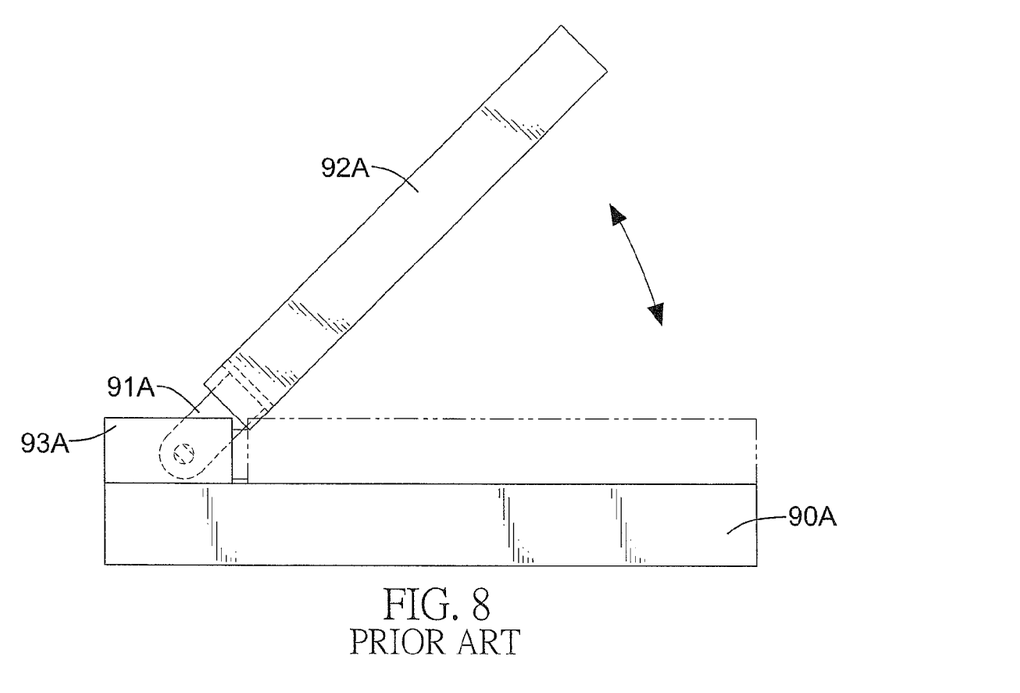
FIG. 8 is an operational side view of another conventional electronic device in accordance with the prior art.

With reference to FIGS. 7 and 8, a conventional electronic device, such as a cell phone and a notebook computer, has a base (90, 90A), a cover (92, 92A), a conventional hinge (91, 91A) and a lid (93, 93A). The conventional hinge (91, 91A) is mounted between the base (90, 90A) and the cover (92, 92A) to allow the cover (92, 92A) pivoting relative to the base (90, 90A). The lid (93, 93A) is mounted on the base (90, 90A) and covers the conventional hinge (91, 91A) to ornament the conventional electronic device.

When the cover (92, 92A) is pivoted relative to the base (90, 90A), the lid (93, 93A) interfere with the end of the cover (92, 92A) to keep the cover (92, 92A) from pivoting. To solve the interference between the cover (92, 92A) and the lid (93, 93A), two conventional ways are shown as follows:

One conventional electronic device is shown in FIG. 7. The end of the lid (93) near the cover (92) has an inclined surface (94). The cover (92) is pivoted along the inclined surface (94) so that the lid (93) does not block the cover (92). However, the inclined surface (94) disfigures the entire appearance of the conventional electronic device.

Another conventional electronic device is shown in FIG. 8. A gap is formed between the cover (92A) and the lid (93A). Therefore, the cover (92A) is kept away from the lid (93A) when the cover (92A) is pivoted. However, the gap not only disfigures the appearance of the conventional electronic device but also increase the volume of the conventional electronic device.

Thus, the conventional ways to solve the interference between the cover (92, 92A) and the lid (93, 93A) disfigure the appearance of the conventional electronic device and increase the volume of the conventional electronic device. To disfigure the appearance of the conventional electronic device and to increase the volume of the conventional electronic device are against the need of the market.

To overcome the shortcomings, the present invention provides a hinge and an electronic device with the hinge to mitigate or obviate the aforementioned problems.

SUMMARY OF THE INVENTION

The main objective of the present invention is to provide a hinge and an electronic device with the hinge that lifts up the cover as desired. The hinge is mounted between a cover and a base of the electronic device. A lid covers the hinge and is attached securely to the base. The hinge has a cam wing, a sleeve, a rotating shaft and a pin. The rotating shaft is mounted slidably in the sleeve. The pin is mounted slidably and transversely through the sleeve, is attached securely to the rotating shaft and slides along the outer edge of the cam wing. When the cover is pivoted to a certain angle, the pin slide at part of the cam wing having larger diameter to gradually lift up the cover so the cover is selectively distant away from the lid. Therefore, the shape of the electronic device does not need to be disfigured and the cover still does not bump against the lid.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
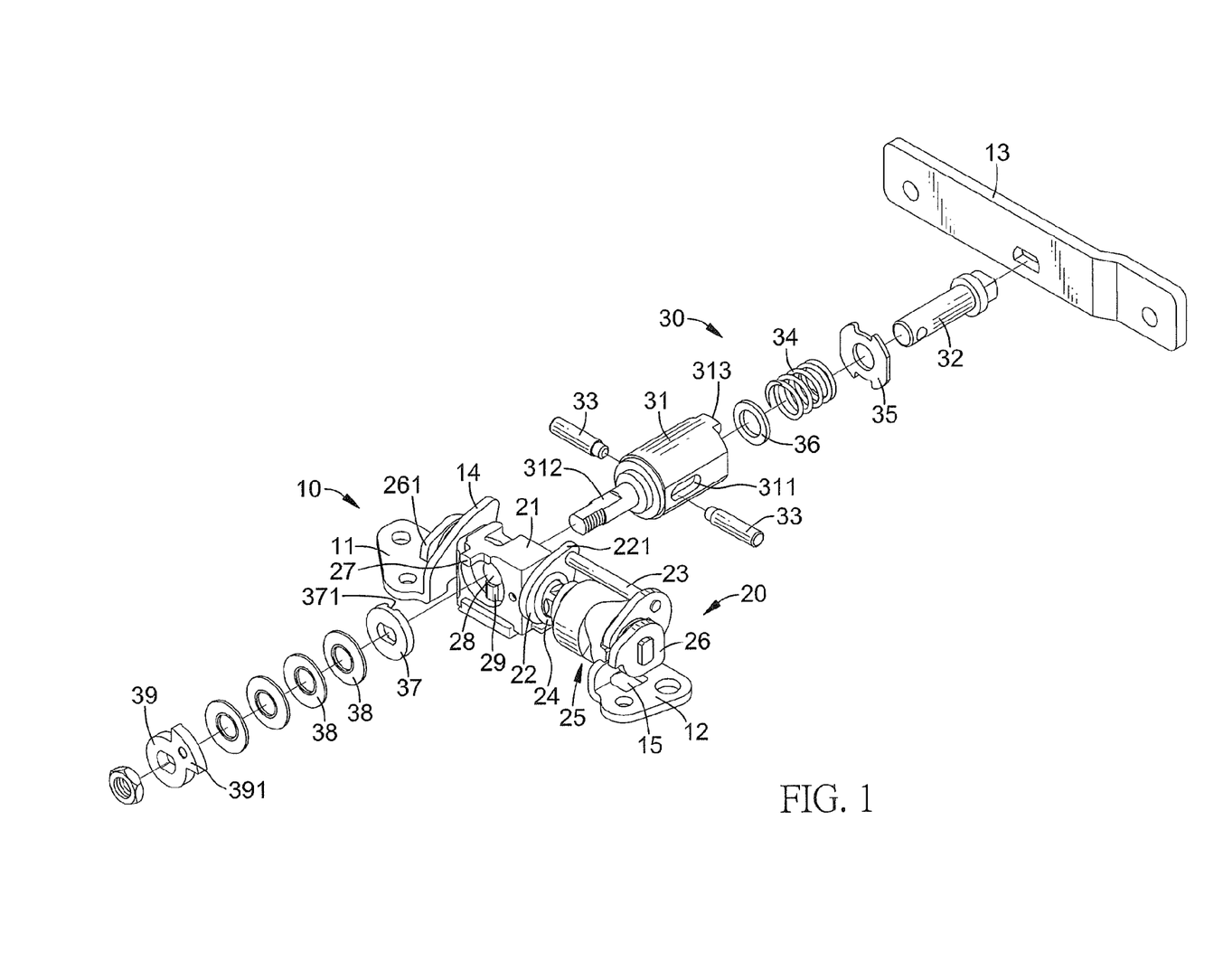
FIG. 1 is a partially exploded perspective view of a hinge in accordance with the present invention.
Figure 2:
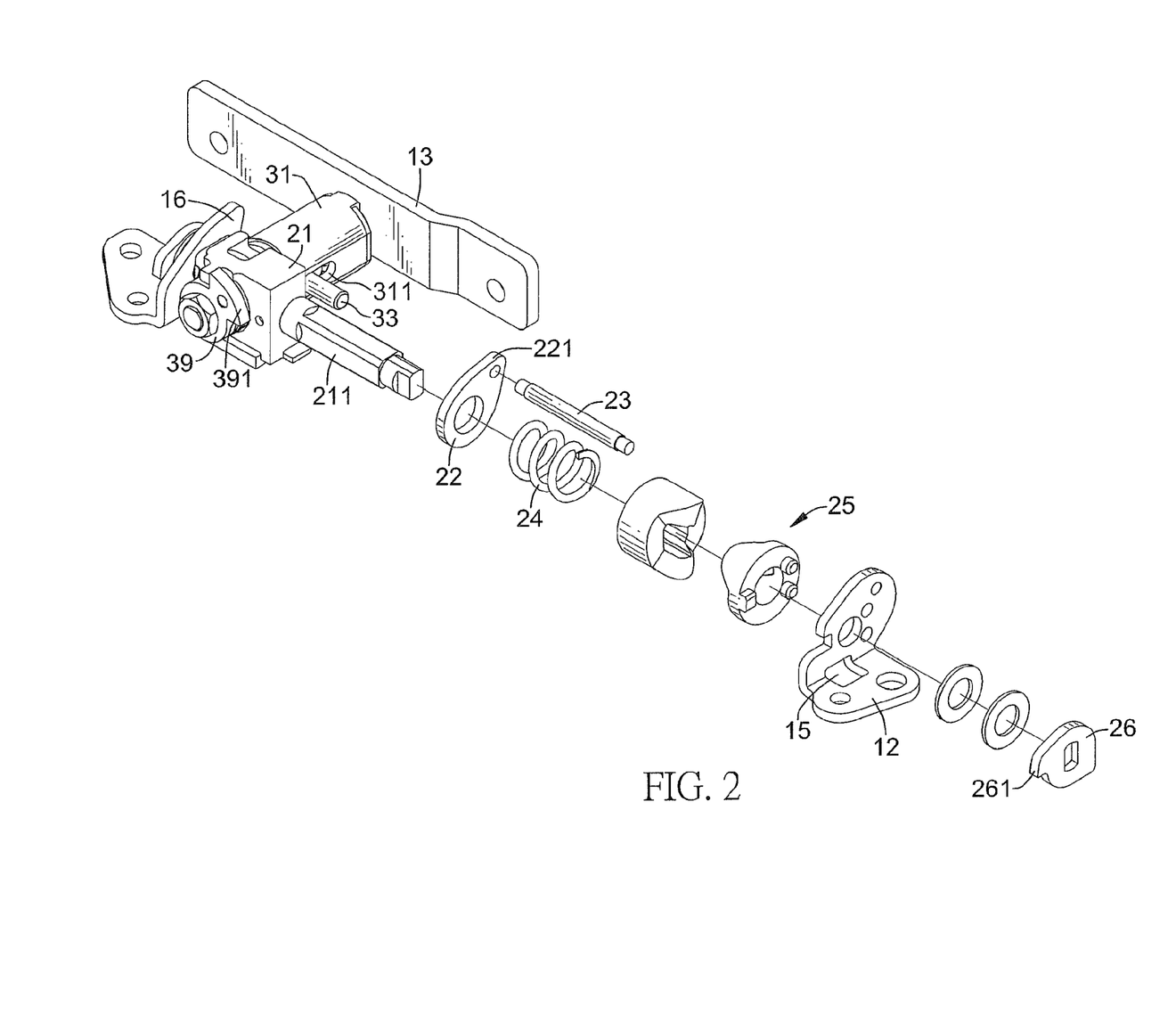
FIG. 2 is another partially exploded perspective view of the hinge in FIG. 1.
Figure 3:
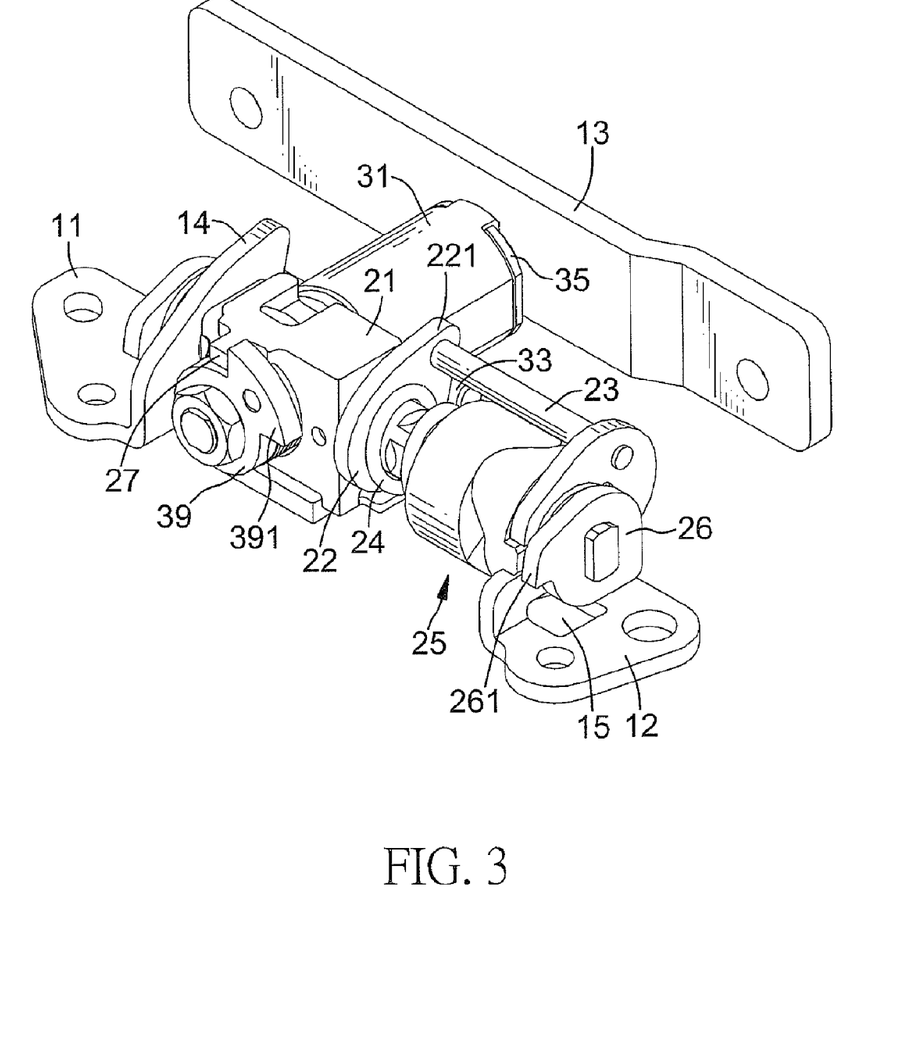
FIG. 3 is a perspective view of the hinge in FIG. 1.

With reference to FIGS. 1 to 3, a hinge in accordance with the present invention comprises a bracket assembly (10), a tilting assembly (20) and a rotating assembly (30).

The bracket assembly (10) has a first tilting bracket (11), a second tilting bracket (12) and a rotating bracket (13).

The first tilting bracket (11) has a mounting wing and a cam wing (16). The mounting wing has a side edge, an abutting surface and a limiting recess. The limiting recess is formed in the abutting surface of the mounting wing near the side edge. The cam wing (16) is formed on the side edge of the mounting wing, may be perpendicular to the mounting wing and has a center and an outer edge (14). The cam wing (16) has multiple diameters to provide that some parts of the outer edge (14) are at larger diameter and some parts of the outer edge (14) are at smaller diameter.

The second tilting bracket (12) are opposite to the first tilting bracket (11) and has an abutting surface and a limiting recess (15). The limiting recess (15) is formed in the abutting surface of the second tilting bracket (12).

The tilting assembly (20) comprises a central frame (21), a first tilting shaft, a second tilting shaft (211), a cam (22), a connecting rod (23), a spring (24), a positioning assembly (25) and two fastening rings (26).

The central frame (21) is mounted between the first and second tilting brackets (11, 12) and has a first side, a second side, a first end, a second end, a mounting hole (28), a limiting protrusion (27) and two positioning protrusions (29). The second side is opposite to the first side. The second end is opposite to the first end and is adjacent to the first and second sides. The mounting hole (28) is formed longitudinally through the first and second sides. The limiting protrusion (27) is formed on and protrudes longitudinally from the second side. The positioning protrusions (29) are formed on the second side and are adjacent to the mounting hole (28).

The first tilting shaft is formed on and protrudes transversely from the first end of the central frame (21), is mounted pivotally through the first tilting bracket (11) and may have a non-circular shape in cross section.

The second tilting shaft (211) is formed on and protrudes transversely from the second end of the central frame (21), is mounted pivotally through the second tilting bracket (12) and may have a non-circular shape in cross section.

The cam (22) is mounted pivotally around the second tilting shaft (211) and has an outer edge (221) corresponding to the outer edge (14) of the cam wing (16) of the first tilting bracket (11).

The connecting rod (23) is mounted respectively through and is attached securely to the cam (22) and the second tilting bracket (12) to fasten the cam (22) to the second tilting bracket (12).

The spring (24) is mounted around the second tilting shaft (211) between the cam (22) and the second tilting bracket (12).

The positioning assembly (25) is mounted around the second titling shaft (13) against the spring (24) and is mounted between the spring (24) and the second tilting bracket (12) to provide positioning function. The positioning assembly (25) may comprise a rotating positioning washer and a stationary positioning washer that rotate relative to each other and have corresponding positioning protrusions and positioning detent.

The fastening rings (26) are respectively mounted securely on the first tilting shaft and second tilting shaft (211). Each fastening ring (26) has an outer edge and a limiting protrusion (261). The limiting protrusion (261) is formed on and protrudes axially from the outer edge of the fastening ring (26) in a way that limiting protrusion (261) is selectively engaged with the limiting recess (15) of the corresponding tilting bracket (11, 12) to limit the rotating angle of the first tilting shaft and second tilting shaft (211).

The rotating assembly (30) is connected to the bracket assembly (10) and the tilting assembly (20). The rotating assembly (30) comprises a sleeve (31), a rotating shaft (32), a pushing washer (36), a holding washer (35), a resilient element (34), two pins (33), a positioning washer (37), multiple resilient washers (38), a limiting ring (39) and a fastening ring.

The sleeve (31) is hollow, is mounted rotatably through the central frame (21) and may be mounted rotatably through the mounting hole (28) of the central frame (21). The sleeve (31) has a sidewall, a connecting end, a holding end, at least one slot (311), a mounting rod (312) and two fastening protrusions (313). The holding end is opposite to the connecting end. The slot (311) is formed through the sidewall of the sleeve (31). The sleeve (31) may have two slots (311) and the slots (311) are opposite to each other. The mounting rod (312) is formed on and protrudes longitudinally from the connecting end of the sleeve (31), is mounted rotatably through the central frame (21) of the tilting assembly (20), has a non-circular shape in cross section and may have threaded outer wall. The fastening protrusions (313) are formed separately on and protrude longitudinally from the holding end of the sleeve (31).

The rotating shaft (32) is mounted slidably in the sleeve (31), protrudes out from the holding end of the sleeve (31) and may be attached securely to the rotating bracket (13).

The pushing washer (36) is mounted slidably in the sleeve (31) and is mounted around the rotating shaft (32).

The holding washer (35) is mounted securely on the holding end of the sleeve (31), is mounted around the rotating shaft (32) and has two notches being attached securely around the fastening protrusions (313) of the sleeve (31).

The resilient element (34) is mounted in the sleeve (31), is mounted around the rotating shaft (32) and may be mounted between and abut the pushing washer (36) and the holding washer (35).

Each pin (33) is mounted through the corresponding slot (311) of the sleeve (31), is attached securely to the rotating shaft (32), presses against the resilient element (34) and may press against the pushing washer (36). One pin (33) slides along the outer edge (14) of the cam wing (16) of the first tilting bracket (11), and the other pin (33) slides along the outer edge (221) of the cam (22).

The positioning washer (37) is mounted around the mounting rod (312) of the sleeve (31) and has a non-circular central hole configured to match the shape of the mounting rod (312), an abutting surface and two positioning recesses (371). The abutting surface of the positioning washer (37) faces the second side of the central frame (21). The positioning recesses (371) are formed in the abutting surface of the positioning washer (37) and selectively engage the positioning protrusions (29) of the central frame (21) to provide positioning function.

The resilient washers (38) are mounted around the mounting rod (312) of the sleeve (31) and abut the positioning washer (37).

The limiting ring (39) is mounted around the mounting rod (312) of the sleeve (31) and has a non-circular central hole, an annular edge and a limiting protrusion (271). The non-circular central hole engages the mounting rod (312) to mount the limiting ring (39) securely on the mounting rod (312). The limiting protrusion (271) is formed transversely on the annular edge of the limiting ring (39) and selectively abuts the limiting protrusion (27) of the central frame (21) to limit the rotating angle of the sleeve (31).

The fastening ring is mounted securely around the mounting rod (312) of the sleeve (31) to hold the limiting ring (39), the resilient washers (38) and the positioning washer (37), and may be a nut being screwed on the threaded outer wall of the mounting rod (312).

Figure 4:
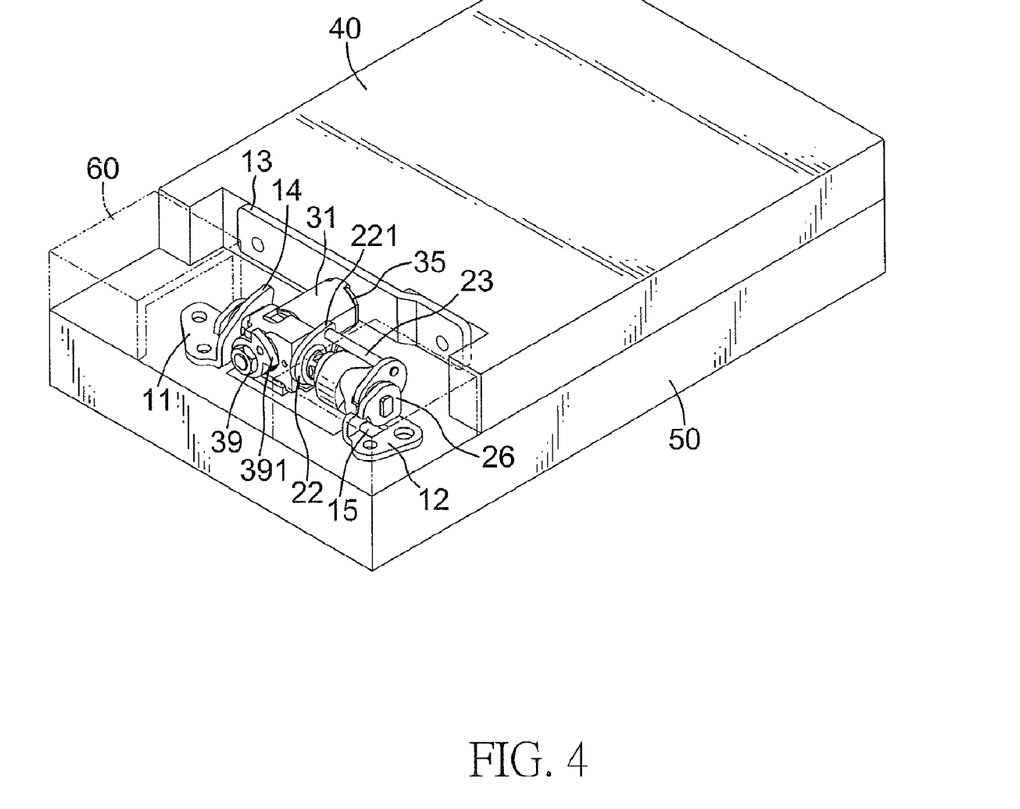
FIG. 4 is a perspective view of an electronic device in accordance with the present invention with the hinge in FIG. 1.
Figure 5:
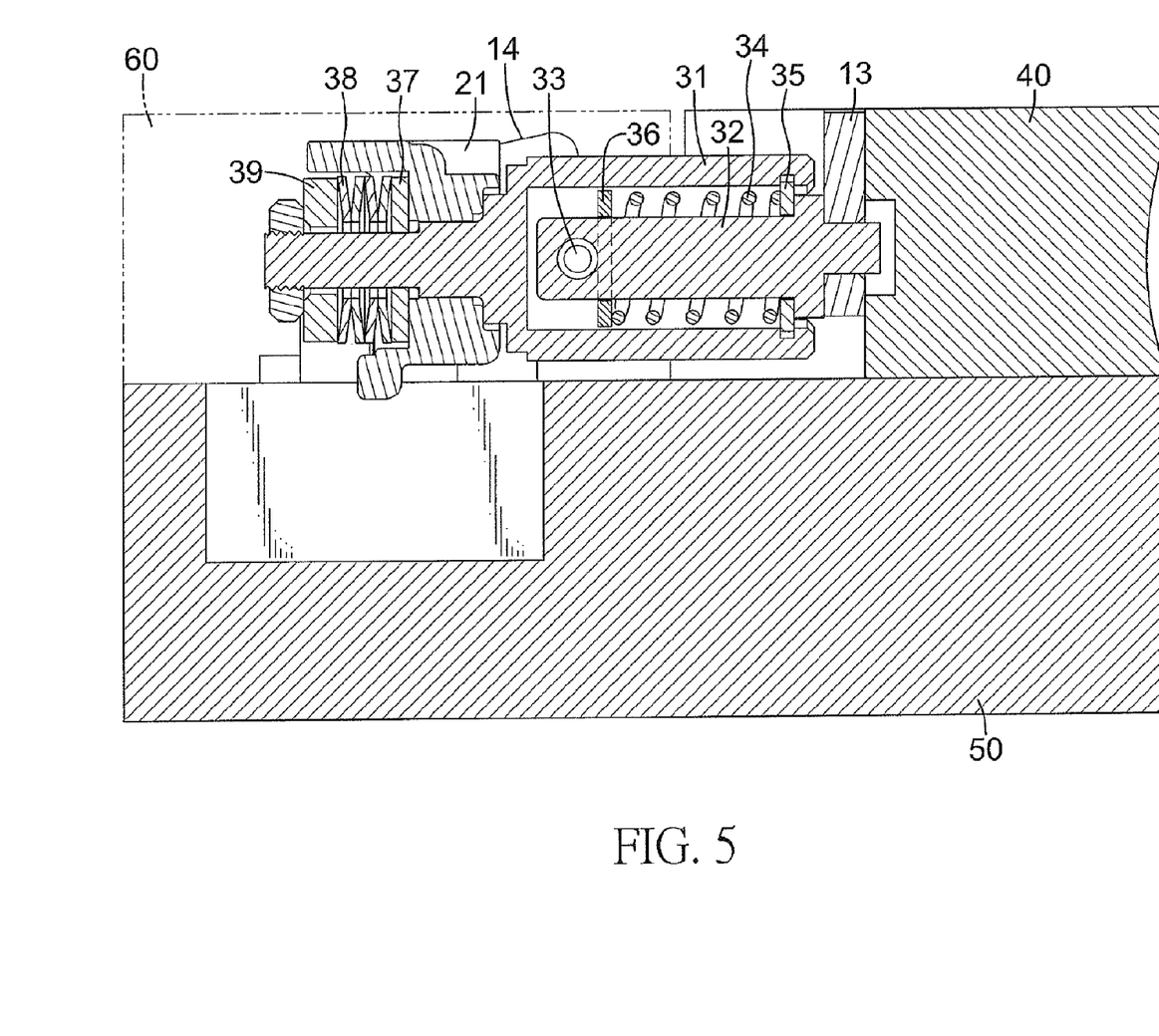
FIG. 5 is an enlarged side view in partial section of the electronic device in FIG. 4.

With further reference to FIGS. 4 and 5, an electronic device in accordance with the present invention comprises a cover (40), a base (50), a hinge as described and a lid (60). The cover (40) is connected pivotally to the base (50). The hinge as described is mounted between the cover (40) and the base (50). The rotating shaft (32) is connected securely to the cover (40) or the rotating bracket (13) may be attached securely to the cover (40). The first and second tilting brackets (11, 12) are attached securely to the base (50). The lid (60) covers the hinge as described and is attached securely to the base (50).

Figures 6A, 6B, 6C:
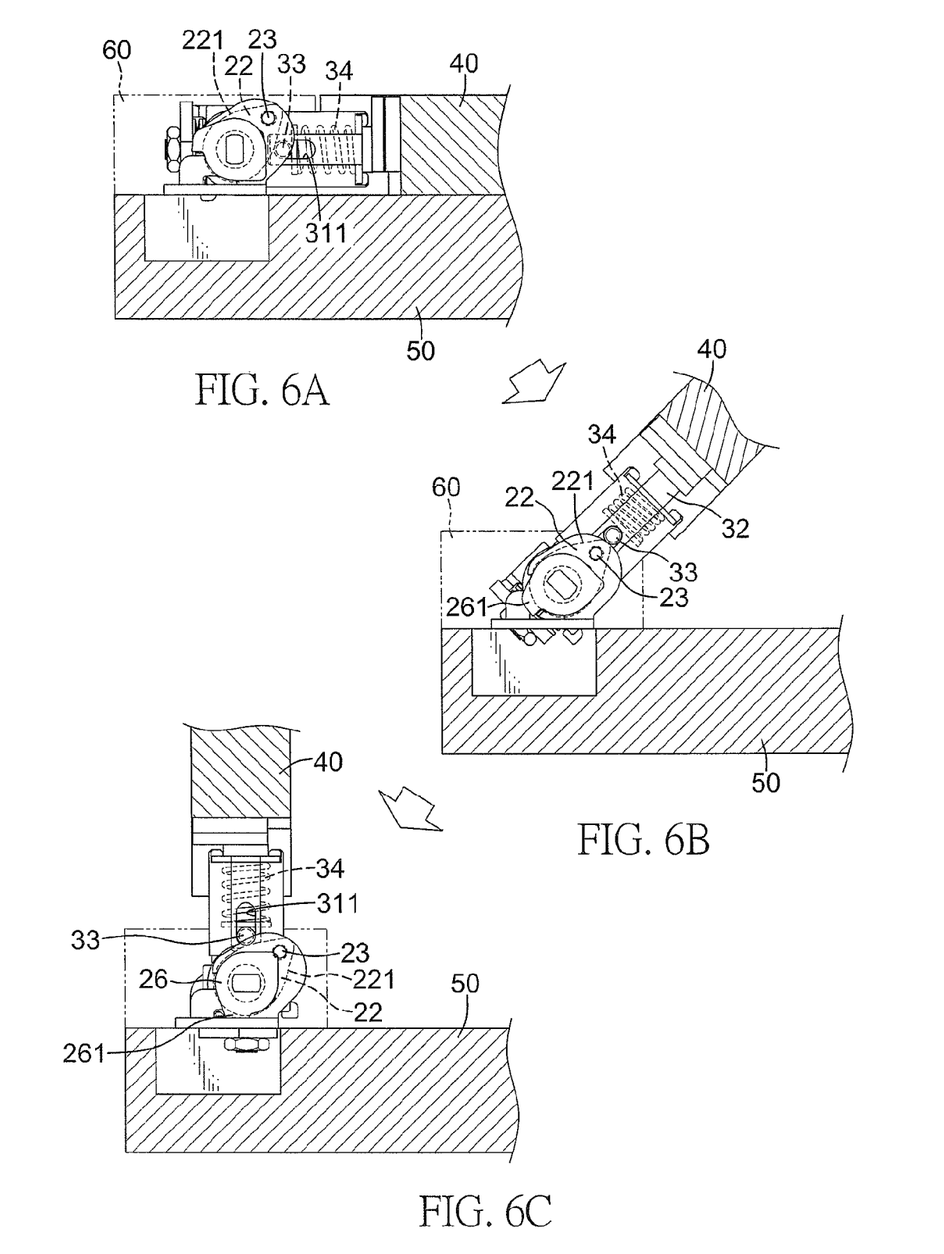
FIGS. 6A, 6B and 6C are operational side views in partial section of the electronic device in FIG. 4.

With further reference to FIGS. 6A, 6B and 6C, the cover (40) is pivoted relative to the base (50). The cover (40) brings the rotating shaft (32) and the central frame (21) to pivot relative to the first and second tilting brackets (11, 12). Then the pins (33) slide along the outer edges (14, 221) of the cam wing (16) and the cam (22). When the pins (33) reach the parts of the outer edges (14, 221) at larger diameter part of the cam wing (16) and the cam (22), the rotating shaft (32) slides upward along longitudinal axis to gradually lift up the cover (40). Because the cover (40) is lifted up to be distant from the lid (60), the cover (40) does not bump against the lid (60) when the cover (40) is pivoted.

When the rotating shaft (32) slides upward, the pins (33) are brought to slide in the slots (311). The pins (33) push the pushing washer (36) to press the resilient element (34). When the cover (40) is continuously pivoted, the pins (33) reach the parts of the outer edges (14, 221) at smaller diameter part of the cam wing (16) and the cam (22). Then the resilient element (34) presses the pushing washer (36) to push the pins (33) to slide. The pins (33) are pushed to slide the rotating shaft (32) to the original position. Therefore, the cover (40) is brought back to the original position.

The hinge and the electronic device as described have following advantages. The hinge smoothly lifts the cover (40) up when the cover (40) is pivoted to a certain angle. Therefore, the shape of the electronic device does not need to be disfigured and the cover (40) still does not bump against the lid (60). Furthermore, the electronic device as described can be sized small and can be shaped exquisitely without influence the smoothness when the cover (40) is pivoted.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
   a bracket assembly having
      a first tilting bracket having
         a mounting wing having a side edge; and
         a cam wing being formed on the side edge of the mounting wing and having an outer edge; and
      a second tilting bracket being opposite to the first tilting bracket;
   a tilting assembly comprising
      a central frame being mounted between the first and second tilting brackets and having
         a first side;
         a second side being opposite to the first side;
         a first end; and
         a second end being opposite to the first end and being adjacent to the first and second sides;
      a first tilting shaft being formed on and protruding transversely from the first end of the central frame and being mounted pivotally through the first tilting bracket; and
      a second tilting shaft being formed on and protruding transversely from the second end of the central frame and being mounted pivotally through the second tilting bracket; and
   a rotating assembly being connected to the bracket assembly and the tilting assembly and comprising
      a sleeve being hollow, being mounted rotatably through the central frame and having
         a sidewall;
         a connecting end;
         a holding end being opposite to the connecting end; and
         at least one slot being formed through the sidewall of the sleeve;
      a rotating shaft being mounted slidably in the sleeve and protruding out from the holding end of the sleeve;
      a resilient element being mounted in the sleeve and being mounted around the rotating shaft; and
      a pin being mounted through a corresponding slot of the sleeve, being attached securely to the rotating shaft, pressing against the resilient element and sliding along the outer edge of the cam wing of the first tilting bracket.

2. The hinge as claimed in claim 1, wherein the tilting assembly further has
   a cam being mounted pivotally around the second tilting shaft and having an outer edge corresponding to the outer edge of the cam wing of the first tilting bracket; and
   a connecting rod being attached securely to the cam and the second tilting bracket;
   the sleeve has two slots being opposite to each other; and
   the rotating assembly further has a pin being mounted through a corresponding slot of the sleeve, being attached securely to the rotating shaft, pressing against the resilient element and sliding along the outer edge of the cam.

3. The hinge as claimed in claim 2, wherein
   the rotating assembly has
      a pushing washer being mounted slidably in the sleeve and being mounted around the rotating shaft; and
      a holding washer being mounted securely on the holding end of the sleeve and being mounted around the rotating shaft;
   the resilient element is mounted between and abut the pushing washer and the holding washer; and
   the pins press against the pushing washer.

4. The hinge as claimed in claim 1, wherein the bracket assembly has a rotating bracket being attached securely to the rotating shaft.

5. The hinge as claimed in claim 3, wherein the bracket assembly has a rotating bracket being attached securely to the rotating shaft.

6. The hinge as claimed in claim 2, wherein the tilting assembly has
   a spring being mounted around the second tilting shaft and being mounted between the cam and the second tilting bracket; and
   a positioning assembly being mounted around the second titling shaft against the spring and being mounted between the spring and the second tilting bracket.

7. The hinge as claimed in claim 5, wherein the tilting assembly has
   a spring being mounted around the second tilting shaft and being mounted between the cam and the second tilting-bracket; and
   a positioning assembly being mounted around the second titling shaft against the spring and being mounted between the spring and the second tilting bracket.

8. The hinge as claimed in claim 1, wherein
   the mounting wing of first tilting bracket has
      an abutting surface; and
      a limiting recess being formed in the abutting surface of the mounting wing near the side edge of the mounting wing;
   the second tilting bracket has
      an abutting surface; and
      a limiting recess being formed in the abutting surface of the second tilting bracket; and
   the tilting assembly has two fastening rings being respectively mounted securely on the first tilting shaft and second tilting shaft, and each fastening ring having
      an outer edge; and
      a limiting protrusion being formed on and protruding axially from the outer edge of the fastening ring and selectively protruding into the limiting recess of a corresponding tilting bracket.

9. The hinge as claimed in claim 7, wherein
   the mounting wing of first tilting bracket has
      an abutting surface; and
      a limiting recess being formed in the abutting surface of the mounting wing near the side edge of the mounting wing;
   the second tilting bracket has
      an abutting surface; and a limiting recess being formed in the abutting surface of the second tilting bracket; and the tilting assembly has two fastening rings being respectively mounted securely on the first tilting shaft and second tilting shaft, and each fastening ring having an outer edge; and a limiting protrusion being formed on and protruding axially from the outer edge of the fastening ring and selectively protruding into the limiting recess of a corresponding tilting bracket.

10. The hinge as claimed in claim 1, wherein
the central frame of the tilting assembly has
a mounting hole being formed longitudinally through the first and second sides;
a limiting protrusion being formed on and protruding longitudinally from the second side; and
two positioning protrusions being formed on the second side and being adjacent to the mounting hole of the central frame;
the sleeve is mounted rotatably through the mounting hole of the central frame and has a mounting rod being formed on and protruding longitudinally from the connecting end of the sleeve and being mounted rotatably through the central frame of the tilting assembly; and
the rotating assembly has
a positioning washer being mounted around the mounting rod of the sleeve and having
an abutting surface facing the second side of the central frame; and
two positioning recesses being formed in the abutting surface of the positioning washer and selectively engaging the positioning protrusions of the central frame;
multiple resilient washers being mounted around the mounting rod of the sleeve and abutting the positioning washer;
a limiting ring being mounted around the mounting rod of the sleeve and having
an annular edge; and
a limiting protrusion being formed transversely on the annular edge of the limiting ring and selectively abutting the limiting protrusion of the central frame; and
a fastening ring being mounted securely around the mounting rod of the sleeve to hold the limiting ring and the resilient washers and the positioning washer.

11. The hinge as claimed in claim 9, wherein
the central frame of the tilting assembly has
a mounting hole being formed longitudinally through the first and second sides;
a limiting protrusion being formed on and protruding longitudinally from the second side; and
two positioning protrusions being formed on the second side and being adjacent to the mounting hole of the central frame;
the sleeve is mounted rotatably through the mounting hole of the central frame and has a mounting rod being formed on and protruding longitudinally from the connecting end of the sleeve and being mounted rotatably through the central frame of the tilting assembly; and
the rotating assembly has
a positioning washer being mounted around the mounting rod of the sleeve and having
an abutting surface facing the second side of the central frame; and
two positioning recesses being formed in the abutting surface of the positioning washer and selectively engaging the positioning protrusions of the central frame;
multiple resilient washers being mounted around the mounting rod of the sleeve and abutting the positioning washer;
a limiting ring being mounted around the mounting rod of the sleeve and having
an annular edge; and
a limiting protrusion being formed transversely on the annular edge of the limiting ring and selectively abutting the limiting protrusion of the central frame; and
a fastening ring being mounted securely around the mounting rod of the sleeve to hold the limiting ring and the resilient washers and the positioning washer.

12. An electronic device comprising:
a base;
a cover being connected pivotally to the base;
a hinge being connected between the base and the cover and comprising
a bracket assembly having
a first tilting bracket being attached securely to the base and having
a mounting wing having a side edge; and
a cam wing being formed on the side edge of the mounting wing and having an outer edge; and
a second tilting bracket being attached securely to the base;
a tilting assembly comprising
a central frame being mounted between the first and second tilting brackets and having
a first side;
a second side being opposite to the first side;
a first end; and
a second end being opposite to the first end and being adjacent to the first and second sides;
a first tilting shaft being formed on and protruding transversely from the first end of the central frame and being mounted pivotally through the first tilting bracket; and
a second tilting shaft being formed on and protruding transversely from the second end of the central frame and being mounted pivotally through the second tilting bracket; and
a rotating assembly being connected to the bracket assembly and the tilting assembly and comprising
a sleeve being hollow, being mounted rotatably through the central frame and having
a sidewall;
a connecting end;
a holding end being opposite to the connecting end; and
at least one slot being formed through the sidewall of the sleeve;
a rotating shaft being mounted slidably in the sleeve, protruding out from the holding end of the sleeve and being connected securely to the cover;
a resilient element being mounted in the sleeve and being mounted around the rotating shaft; and
a pin being mounted through a corresponding slot of the sleeve being attached securely to the rotating shaft, pressing against the resilient element and sliding along the outer edge of the cam wing of the first tilting bracket; and a lid covering the hinge and being attached securely to the base.

13. The electronic device as claimed in claim 12, wherein the tilting assembly further has
 a cam being mounted pivotally around the second tilting shaft and having an outer edge corresponding to the outer edge of the cam wing of the first tilting bracket; and
 a connecting rod being attached securely to the cam and the second tilting bracket;
the sleeve has two slots being opposite to each other; and
the rotating assembly further has a pin being mounted through a corresponding slot of the sleeve, being attached securely to the rotating shaft, pressing against the resilient element and sliding along the outer edge of the cam.

14. The electronic device as claimed in claim 13, wherein the rotating assembly has
 a pushing washer being mounted slidably in the sleeve and being mounted around the rotating shaft; and
 a holding washer being mounted securely on the holding end of the sleeve and being mounted around the rotating shaft;
the resilient element is mounted between and abut the pushing washer and the holding washer; and
the pins press against the pushing washer.

15. The electronic device as claimed in claim 12, wherein the bracket assembly has a rotating bracket being attached securely to the rotating shaft and being attached securely to the cover.

16. The electronic device as claimed in claim 14, wherein the bracket assembly has a rotating bracket being attached securely to the rotating shaft and being attached securely to the cover.

17. The electronic device as claimed in claim 13, wherein the tilting assembly has
 a spring being mounted around the second tilting shaft and being mounted between the cam and the second tilting bracket; and
 a positioning assembly being mounted around the second titling shaft against the spring and being mounted between the spring and the second tilting bracket.

18. The electronic device as claimed in claim 16, wherein the tilting assembly has
 a spring being mounted around the second tilting shaft and being mounted between the cam and the second tilting bracket; and
 a positioning assembly being mounted around the second titling shaft against the spring and being mounted between the spring and the second tilting bracket.

19. The electronic device as claimed in claim 18, wherein the mounting wing of first tilting bracket has
 an abutting surface; and
 a limiting recess being formed in the abutting surface of the mounting wing near the side edge of the mounting wing;
the second tilting bracket has
 an abutting surface; and
 a limiting recess being formed in the abutting surface of the second tilting bracket; and
the tilting assembly has two fastening rings being respectively mounted securely on the first tilting shaft and second tilting shaft, and each fastening ring having
 an outer edge; and
 a limiting protrusion being formed on and protruding axially from the outer edge of the fastening ring and selectively protruding into the limiting recess of a corresponding tilting bracket.

20. The electronic device as claimed in claim 19, wherein the central frame of the tilting assembly has
 a mounting hole being formed longitudinally through the first and second sides;
 a limiting protrusion being formed on and protruding longitudinally from the second side; and
 two positioning protrusions being formed on the second side and being adjacent to the mounting hole of the central frame;
the sleeve is mounted rotatably through the mounting hole of the central frame and has a mounting rod being formed on and protruding longitudinally from the connecting end of the sleeve and being mounted rotatably through the central frame of the tilting assembly; and
the rotating assembly has
 a positioning washer being mounted around the mounting rod of the sleeve and having
  an abutting surface facing the second side of the central frame; and
  two positioning recesses being formed in the abutting surface of the positioning washer and selectively engaging the positioning protrusions of the central frame;
 multiple resilient washers being mounted around the mounting rod of the sleeve and abutting the positioning washer;
 a limiting ring being mounted around the mounting rod of the sleeve and having
  an annular edge; and
  a limiting protrusion being formed transversely on the annular edge of the limiting ring and selectively abutting the limiting protrusion of the central frame; and
 a fastening ring being mounted securely around the mounting rod of the sleeve to hold the limiting ring and the resilient washers and the positioning washer.

\* \* \* \* \*